(12) United States Patent
Belloso

(10) Patent No.: US 7,287,797 B1
(45) Date of Patent: Oct. 30, 2007

(54) AUTOMOTIVE VEHICLE HAVING A MODULAR PLASTIC BODY ATTACHED TO A METAL CHASSIS

(76) Inventor: Gregorio M. Belloso, 5302 Chinaberry Dr., Salisbury, MD (US) 21801

( * ) Notice: Subject to any disclaimer, the term of this patent is extended or adjusted under 35 U.S.C. 154(b) by 68 days.

(21) Appl. No.: 11/366,648

(22) Filed: Mar. 3, 2006

(51) Int. Cl.
  *B62D 25/20* (2006.01)
  *B62D 27/04* (2006.01)
(52) U.S. Cl. .................. 296/35.1; 296/204; 296/181.2; 296/193.07
(58) Field of Classification Search ................ 296/204, 296/205, 35.1, 181.2, 193.07, 193.08, 193.09, 296/187.02, 901.01, 193.04, 181.4, 35.3
See application file for complete search history.

(56) References Cited

U.S. PATENT DOCUMENTS

| | | | |
|---|---|---|---|
| 657,430 A * | 9/1900 | Maxim | .................. 280/796 |
| 1,707,214 A | 3/1929 | Lord | |
| 3,415,568 A | 12/1968 | Gugelot et al. | |
| 3,632,156 A | 1/1972 | Schweser | |
| 4,453,763 A | 6/1984 | Richards | |
| 5,219,439 A * | 6/1993 | Moore et al. | .............. 296/35.1 |
| 7,144,040 B2 * | 12/2006 | Kiehl et al. | ................. 280/785 |

FOREIGN PATENT DOCUMENTS

| | | |
|---|---|---|
| FR | 817777 | 10/1960 |
| GB | 910251 | 11/1962 |

\* cited by examiner

*Primary Examiner*—Dennis H. Pedder
(74) *Attorney, Agent, or Firm*—Norman B. Rainer

(57) ABSTRACT

An automotive vehicle is constructed having a metal framework and a body made of interconnected plastic components including a floor module. The framework has elongated longitudinal and transverse structural members of uniform cross sectional configuration. The underside of the floor module has downwardly directed troughs positioned and configured to engage the elongated structural members. Resilient bushing material is disposed between the engaged troughs and structural members, and is compressively held in place by U-shaped brackets which urge the structural members into the corresponding troughs. By virtue of such construction, the framework and body are integrated in a manner which minimizes stresses that would otherwise be conveyed to the body from the framework.

9 Claims, 12 Drawing Sheets

AUTOMOTIVE VEHICLE HAVING A MODULAR PLASTIC BODY ATTACHED TO A METAL CHASSIS

BACKGROUND OF THE INVENTION

1. Field of the Invention

This invention concerns an automotive vehicle which is economically assembled from a plastic body and a metal frame, and more particularly concerns the manner of attachment of a modular plastic body to a metal frame.

2. Description of the Prior Art

The body and chassis of motor vehicles such as automobiles, vans, and trucks are constructed in either of two ways. One way is to assemble, mostly through welding, various pre-formed sheet steel panels to create the body of the vehicle, then to bolt the body to a supporting metal framework known as the chassis. Another way is to construct the body and the chassis together as a monocoque, i.e., all parts of the body and the chassis are welded together as a single unit. Although both methods produce high quality vehicles, these methods have several disadvantages.

Firstly, these manufacturing processes are complex and expensive. They require a vast number of steps including the stamping of each separate body and chassis part and the assembling and welding of each of these parts to the others to create a complete body and chassis. This generally requires large investments in factory equipment and the requisite dies, so much so that stamping runs of less than tens of thousands are generally unprofitable. It also makes it difficult to use this method to manufacture vehicles that would be sufficiently inexpensive to be affordable to less affluent individuals in the less developed countries of the world.

Secondly, steel body panels tend to deform and dent when struck with anything but the lightest of forces. These vehicles are therefore easily damaged, resulting in high insurance and repair costs.

Plastic body panels are dent and rust resistant but lack the structural strength of steel panels. By way of reinforcement with fiberglass or other high modulus fibers, plastic panels achieve considerably greater strength. Another technique for increasing the strength and stiffness of plastic automotive panels is to incorporate a reinforcing foam structure into the interior surface or core layer of the panel.

The attachment of plastic components to a vehicle chassis fabricated of steel or other strong metals is complicated by the fact that load-bearing, torsional bending stresses, and vibrational effects cause deterioration of the metal/plastic interface.

U.S. Pat. No. 6,457,768 discloses plastic vehicle body panels containing structural fiber material molded into the panels.

U.S. Pat. No. 4,917,435 discloses a truck cab fabricated by interengagement of a unitary upper plastic member with a unitary lower plastic member having floor and rear wall portions. Said interengagement is secured by adhesive bonding applied at interlocking edges. Similarly, U.S. Pat. No. 4,759,489 describes the production of an automobile body by joining an upper module with a lower module having a floor portion.

U.S. Pat. No. 5,195,779 discloses plastic vehicle side panels comprised of a foam core sandwiched between outer skin layers, and attachment of said side panels to a body structure by way of specialized interactive fittings.

U.S. Pat. No. 5,660,427 describes the production of a passenger cab shell from a plurality of plastic panels assembled together along overlapping edge portions. The cab shell is then attached to a plastic truck box portion.

U.S. Pat. No. 5,314,230 discloses the joinder of two halves of a plastic upper body member which in turn are joined to a fiber reinforced lower member to comprise a monocoque vehicle assembly. Said joinder is achieved by interactive channel and guide structures which receive adhesive.

U.S. Pat. No. 5,228,742 describes apparatus for connecting a composite outer body of a vehicle to a composite underbody, said apparatus comprising interconnecting flexible tabs which permit relative movement of said outer body with respect to said underbody.

U.S. Pat. No. 5,915,781 discloses the joinder of plastic vehicle body members by injecting an adhesive into a channel cavity formed at the interface of the body members.

U.S. Pat. No. 5,129,700 describes a vehicle frame that supports a floor pan defining the bottom of the interior of a vehicle. The floor pan is provided with attachment devices for fixing the floor pan to the frame, said attachment devices including bolts and elastic adhesive.

U.S. Pat. No. 5,806,620 discloses an automobile having a plastic body bonded to a steel frame and a unitary plastic front end pivotably connected to the frame and releasably connectable to the body by means of elastic straps.

U.S. Pat. No. 5,964,490 describes a plastic automobile body bonded to a steel frame by an adhesive layer deposited between the body and frame to accommodate thermal expansion effects.

U.S. Pat. No. 5,879,042 discloses a rigid box-like coupler having two open ends for coupling car body parts.

U.S. Pat. No. 4,453,763 discloses an automobile having a plastic tub supported by a steel frame chassis. Outwardly directed flanges at the tub's outer edge rest directly on the frame except in limited areas where the tub is secured to the frame with bolted plates and intervening bushings. Although such manner of securement may lessen the effects of vertical stress forces, it is ineffective in coping with horizontally directed forces.

British Patent 0910251 discloses a motor car having a unitary laminated fiberglass body and chassis with embedded metal bracing.

U.S. Pat. No. 3,632,156 discloses a unitary plastic body with inverted channels that engage side bars in the underlying chassis.

French Patent 1.247.668 teaches the use of a vibration absorbing elastic bushing interposed between a downwardly open trough of the body of a vehicle and a semi-spherical part of the frame.

U.S. Pat. No. 1,707,214 discloses a joint between the body and chassis of an automobile having a bushing bonded to bolted plates.

U.S. Pat. No. 4,352,520 teaches the use of a bushing member with a Shore A hardness of 45 as an insert between the body and chassis of a vehicle.

U.S. Pat. No. 3,415,568 describes a vehicle body underframe comprising a unitary body and chassis with outer and inner shell members defining therebetween a cavity which is filled with a hard plastic foam.

Although the aforesaid Patents address the issue of joining plastic body components to chassis or frame components of a vehicle, they do not resolve the challenge of providing a durable low cost vehicle having plastic body components.

Durability can only be achieved if the plastic components, which lack the strength, toughness and hardness of metals, are adequately protected from early structural failure. Such protection involves the following factors: Firstly, the plastic body must be protected from the twisting, bending and load-carrying stresses borne by the vehicle. This is best done by causing the chassis to be strong and rigid enough to withstand such stresses without deformation and providing extensive areas which resiliently support the body.

Secondly, the modular plastic body must, itself, be internally reinforced so that it will resist damage by loads and other forces to which it may be subjected.

Thirdly, the plastic body must be equipped with extensive downwardly directed means interactive with the chassis to prevent downward, upward, sideward, forward and rearward displacement of the body on the chassis and to disperse all forces transmitted from the chassis to the plastic body over a wide area of interaction.

Fourthly, extensive protective bushings must be interposed in all the areas of supportive attachment between the plastic body and the chassis to prevent fragmentation and abrasive erosion of the relatively soft and brittle plastic material at said metal/plastic interface. In combination, the aforesaid factors have been found capable of providing a durable low cost vehicle having a modular plastic body.

It is accordingly an object of the present invention to provide an inexpensive motor vehicle having a modular plastic body joined to a conventional metal chassis.

It is a further object of this invention to provide a plastic vehicle body adapted to be mounted onto a steel chassis in a manner to distribute the stresses of load-bearing and vibration over broad areas of the plastic body.

It is an additional object of the present invention to provide a steel chassis adapted to provide support to a modular plastic body in a manner to distribute the stresses of load-bearing and vibration over substantially broad areas of the plastic body sufficiently to prevent any particular point of said plastic body from being subjected to destructive concentrated torsional, flexural or load-bearing forces.

It is still an additional object of this invention to provide a plastic vehicle body mounted on a steel chassis in a manner to interlock said chassis and said plastic body over broad areas of inter-engagement as to restrict downward, upward, forward, rearward and sideward movement of said body relative said chassis.

It is another object of this invention to provide shock absorbing means for attaching a modular plastic vehicle body to a steel chassis over substantially all areas of attachment.

It is still another object of this invention to provide an inexpensive motor vehicle having a modular plastic body joined to a metal chassis wherein said plastic body is strengthened by reinforcement material.

These objects and other objects and advantages of the invention will be apparent from the following description.

SUMMARY OF THE INVENTION

The above and other beneficial objects and advantages are accomplished in accordance with the present invention by an automotive vehicle comprising:

a) a chassis comprising a metal framework having paired elongated straight longitudinal structural members and structural cross members orthogonally joined to said longitudinal members, said structural members having uniform cross sectional configurations, b) a body comprised of interlocked plastic components, including a floor module containing downwardly opening troughs adapted to seat upon said structural members, and c) bushing means compressively secured between said structural members and troughs in a manner to bear and absorb all loads, stresses and vibrations between said body and chassis.

Other plastic body components interactive with said floor module include doors, front hood and trunk lid. Said floor module and interactive components are designed to be amenable to easy manufacture as separate units through methods such as rotational moulding of suitable plastic material to create a strong dent-resistant skin, preferably reinforced by a foamed-in rigid structural plastic foam core; or through blow molding to create skins of suitable strength and thickness, followed by foaming-in the supporting rigid plastic foam core; or by thermoforming thermoplastic sheets and again foaming-in the structural foam core; or by using other similar and suitable fabrication methods familiar to those skilled in the art.

Said floor module and other body components are preferably made having edge configurations that facilitate achievement of precise positioning and interattachment, preferably by way of "snap-fit" assembly. Specific configurations may include mortise-and-tenon, and tongue-and-groove type joints.

Said floor module and other body components may be made with internal or external reinforcements as needed through the incorporation of suitable high modulus materials such as metal forms and natural, synthetic or metallic fibers and fabrics made thereof.

For reasons of cost savings, other features of the vehicle may be incorporated into said floor module as attached or monolithic components. Such features include, for example, hinge fittings for attachment of side doors, front hood and trunk lid, securing means for seats, recesses to accommodate underlying transmission and drive shaft, engine support, fenders, roof attachment means, front fire wall, rear wall, dashboard and steering wheel mount.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

Figure 1:
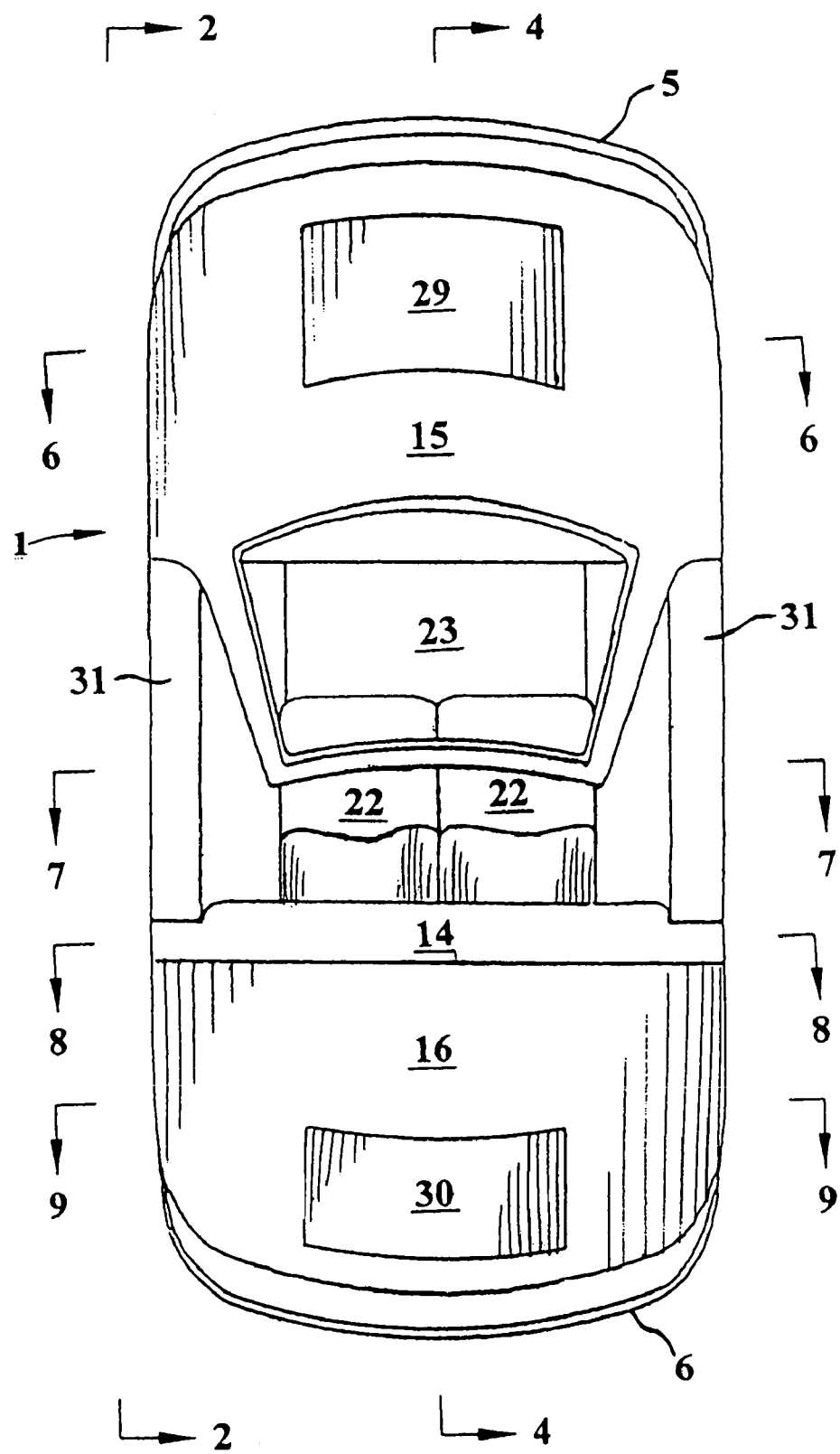
FIG. 1 is a top view of an embodiment of an automotive vehicle of this invention having a plastic body attached to a metal chassis.
Figure 2:
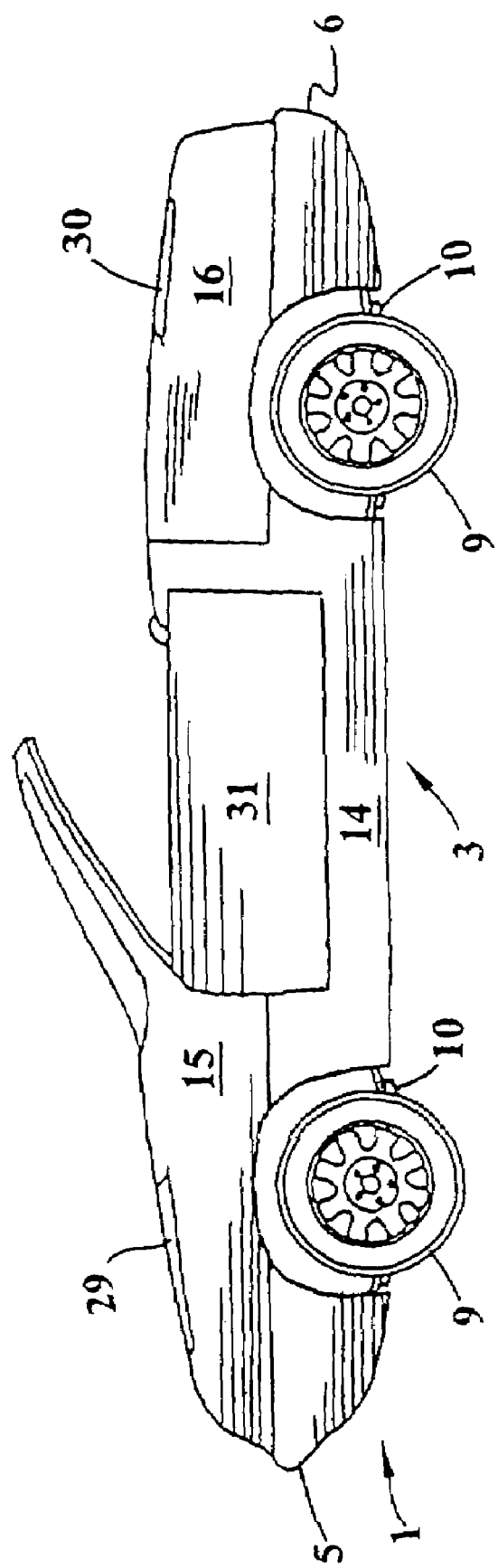
FIG. 2 is a left side view of the vehicle along line 2-2 of FIG. 1.
Figure 3:
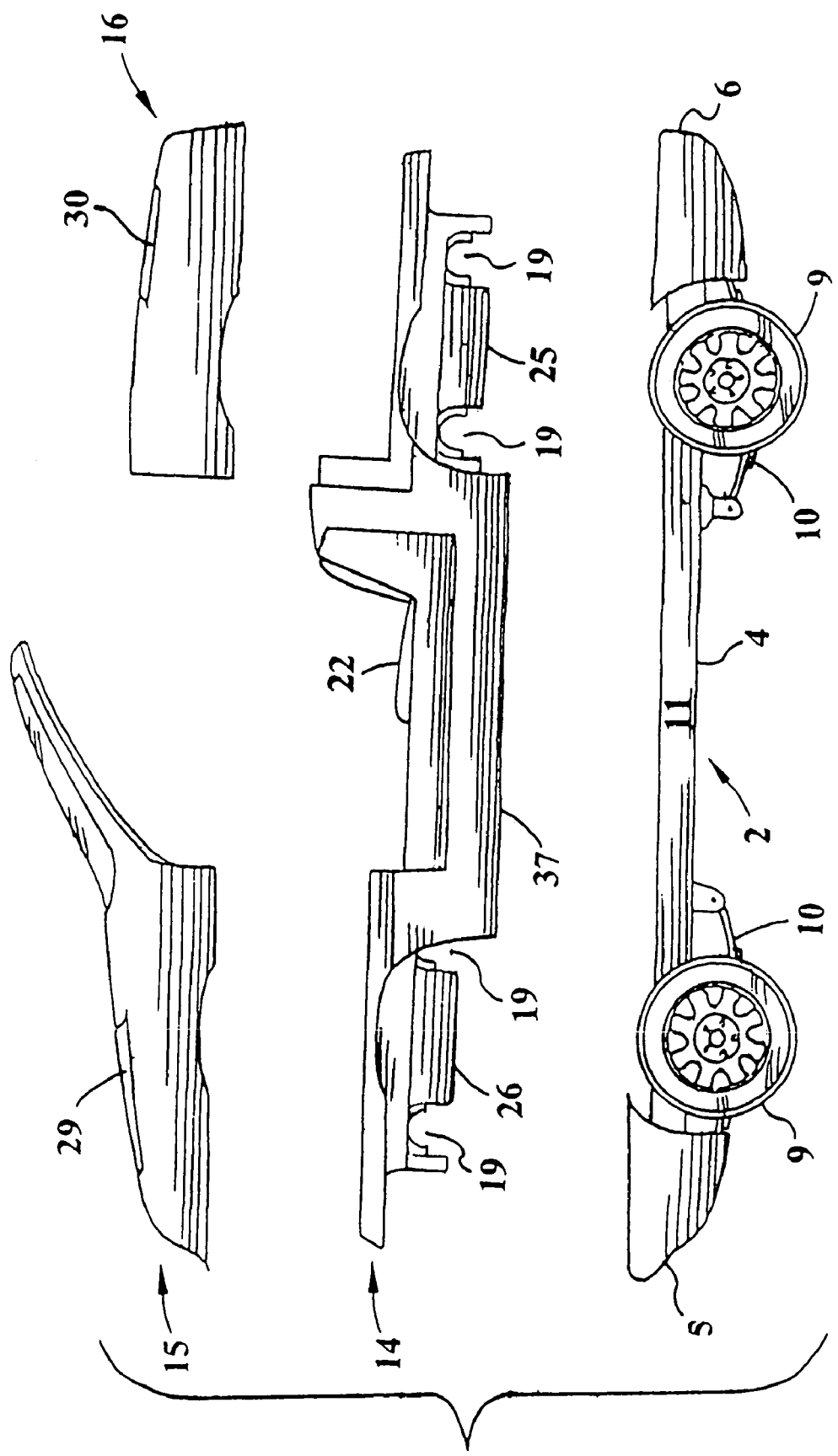
FIG. 3 is an exploded left side view of the vehicle shown in FIG. 2 with omission of the doors.

For clarity of illustration, details which are not relevant to the invention, such as the engine, power train, steering assembly and suspension system, etc., have been omitted from the aforesaid drawings.

DESCRIPTION OF THE PREFERRED EMBODIMENT

Referring now to FIGS. 1-12, there is shown an embodiment of an automobile 1 of the present invention having chassis assembly 2 and body 3. Chassis assembly 2 includes a metal framework 4, front bumper 5, rear bumper 6, front bumper support 7 and rear bumper support 8. Wheels 9 and springs 10 support the chassis assembly 2. Framework 4 includes paired left and right longitudinal structural members 11 and 12, respectively, and structural cross members 13. All said framework members 11, 12, and 13 are securedly welded together in orthogonal relationship to form a unitary assembly. Framework 4 is designed to be strong enough to withstand all the flexural and torsional loads and stresses borne by the vehicle while it is in operation, without any need for additional support from the torsional or flexural rigidity of the automobile body itself. It is, therefore, best made out of strong material such as steel, aluminum, or magnesium-aluminum alloys, and the like.

The body 3 is made by joining together three separately fabricated modules, namely the floor-seats-and-walls module, henceforth called the floor module 14, the cowl-and-windshield module, henceforth called the cowl module 15, and the rear module 16. Each said module can be mass produced economically with molded plastic using standard plastic fabrication techniques well known to those skilled in the art. For example, a one-piece floor module 14 can be made using a suitably designed bivalve mold, by first coating the cavity of the mold with the proper thickness of suitably strong plastic material for the skin through rotational or injection molding and then filling the cavity with suitably strong structural foam. Alternatively, an even more economical "one step" procedure may be used. One such method employs an especially formulated plastic material which is directly injected into the mold where foaming occurs from the center of the mold outwards. Vapor pressure consolidates the material on the mold surfaces, thereby creating integral surface skins while the remainder of the mold cavity becomes filled with a structural foam core. The cowl module 15 and the rear module 16 may be made similarly.

Figure 4:
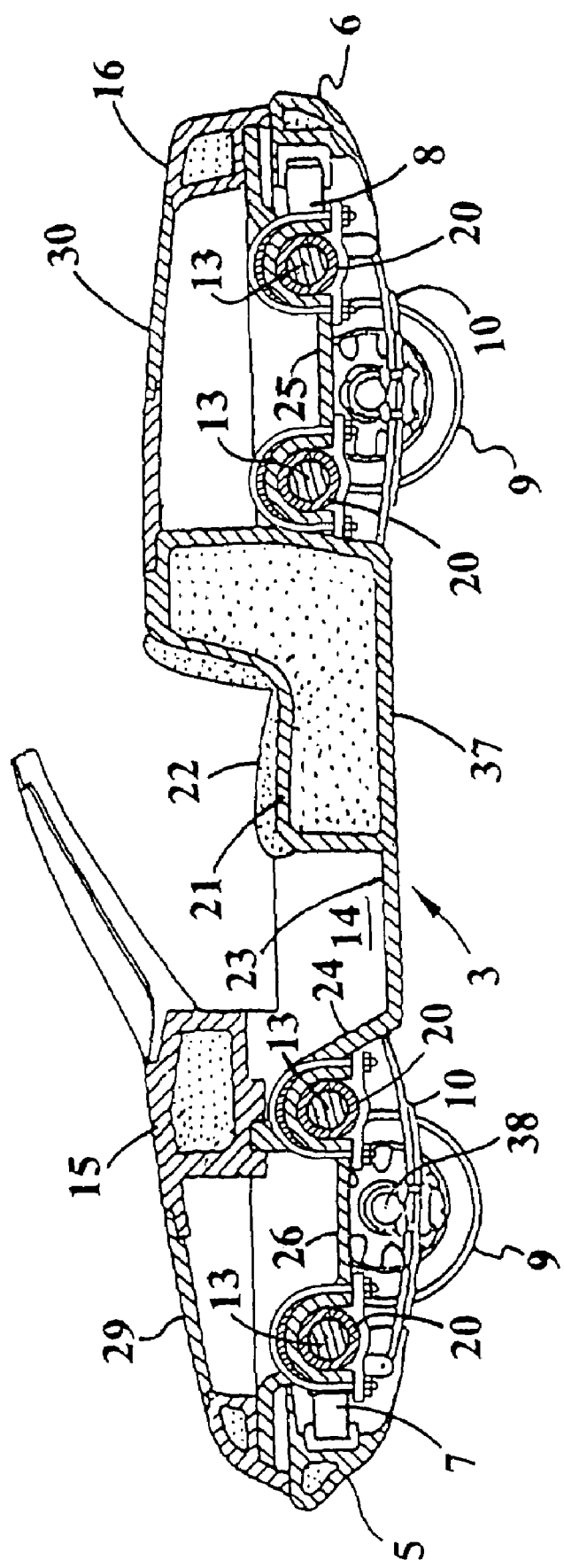
FIG. 4 is a sectional view of the vehicle along line 4-4 of FIG. 1, shown with the doors removed.
Figure 5:
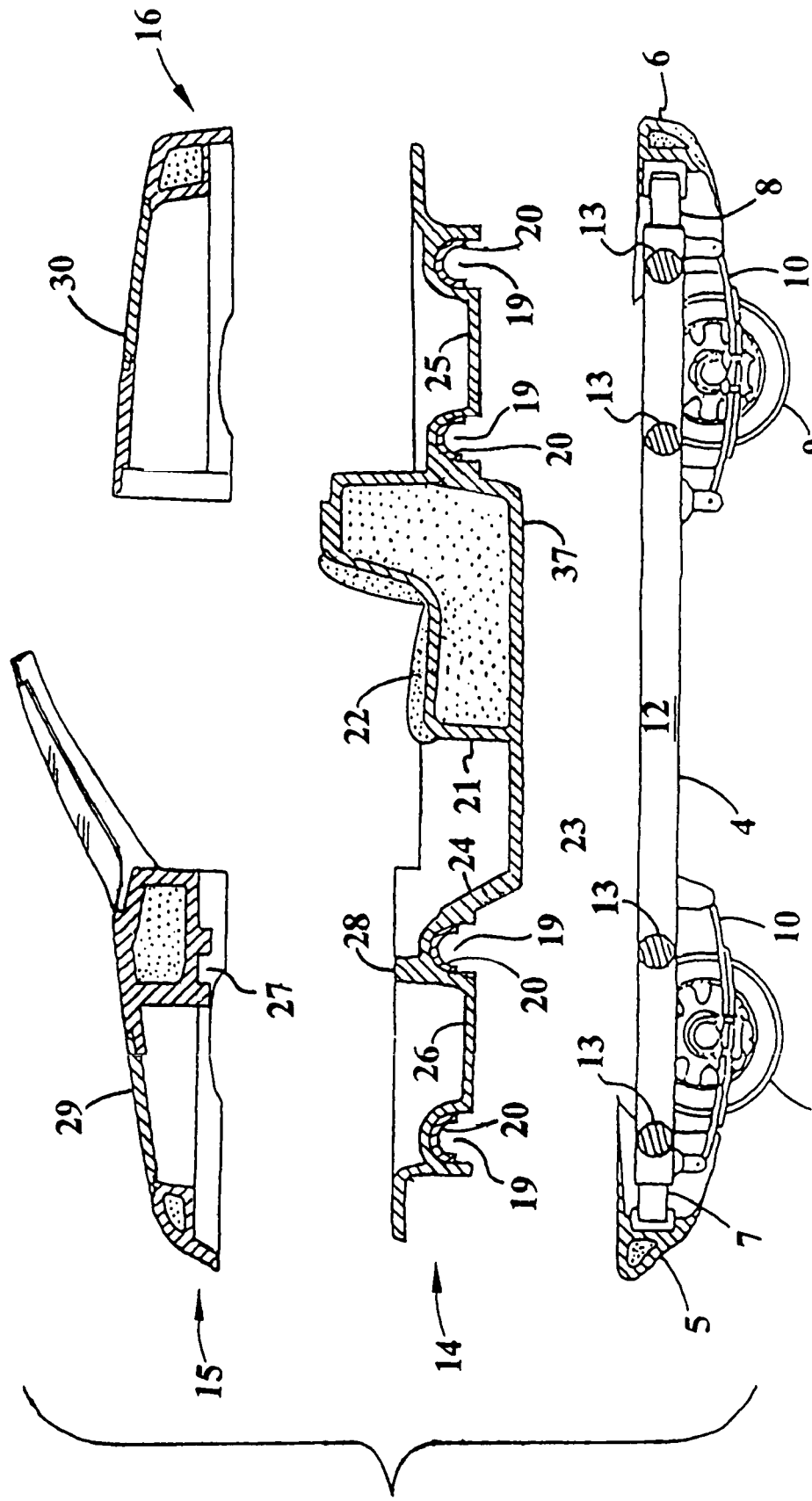
FIG. 5 is an exploded version of the sectional view of the vehicle shown in FIG. 4.
Figure 6:
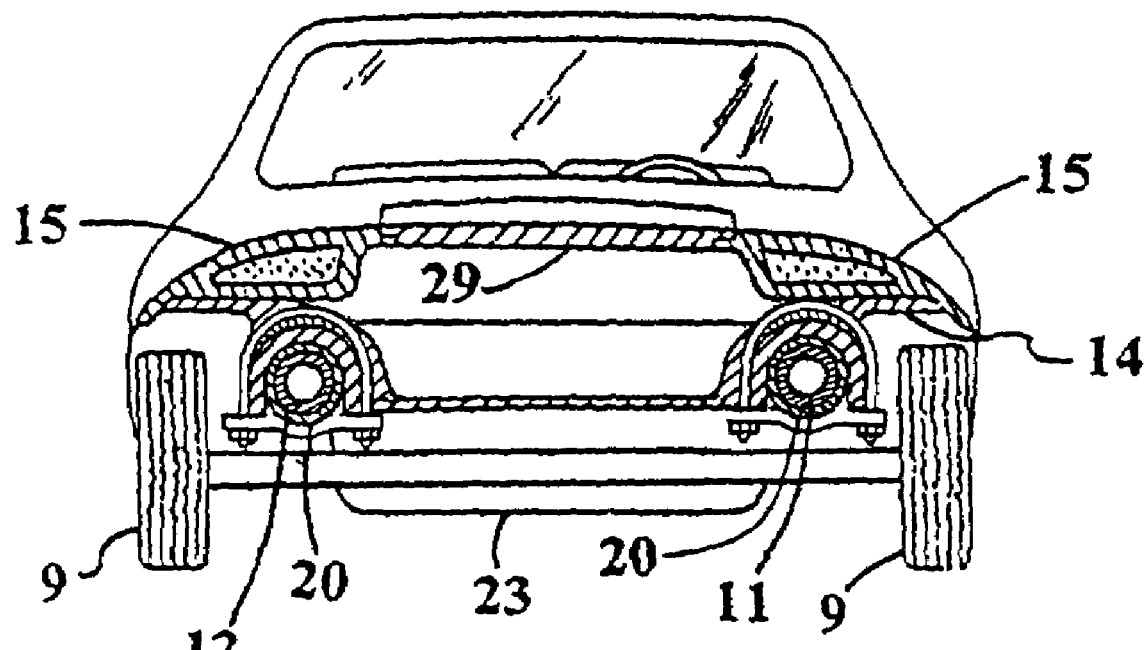
FIG. 6 is a sectional view of the vehicle along line 6-6 of FIG. 1.
Figure 7:
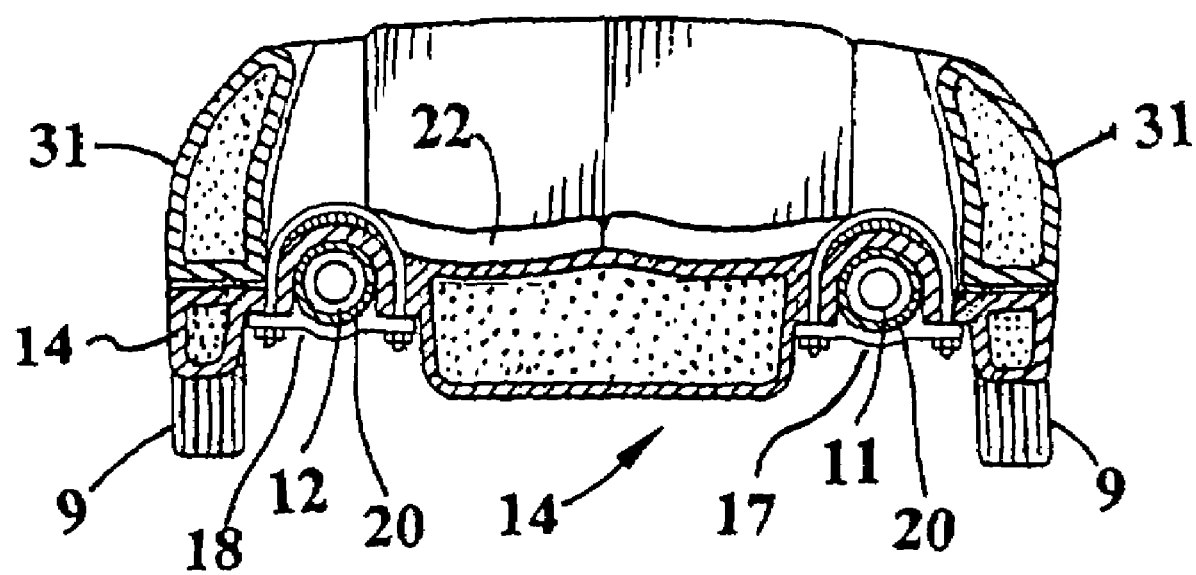
FIG. 7 is a sectional view of the vehicle along line 7-7 of FIG. 1.
Figure 8:
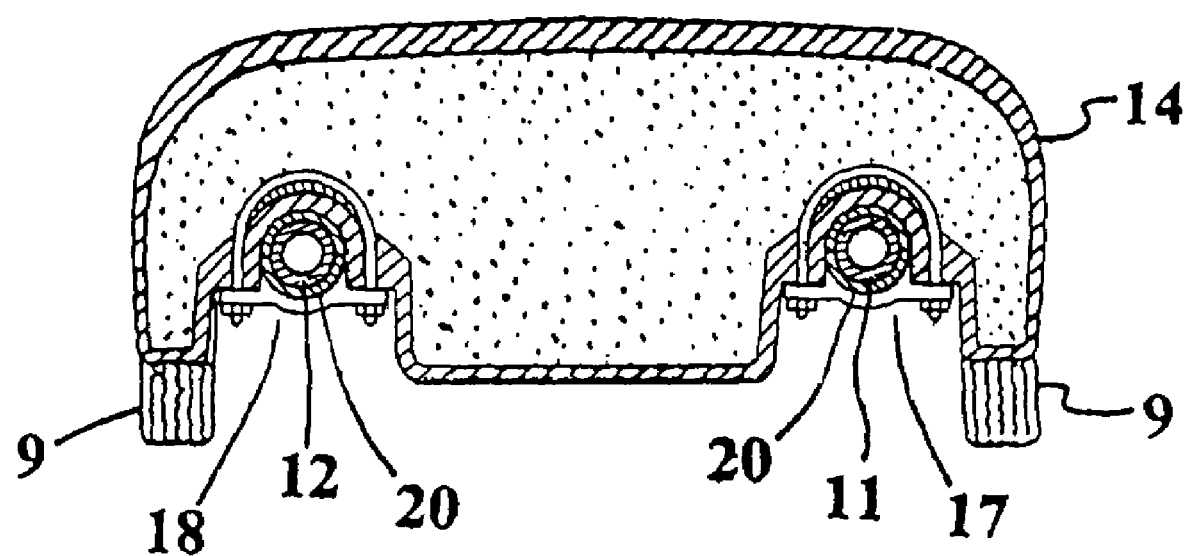
FIG. 8 is a sectional view along line 8-8 of FIG. 1.
Figure 9:
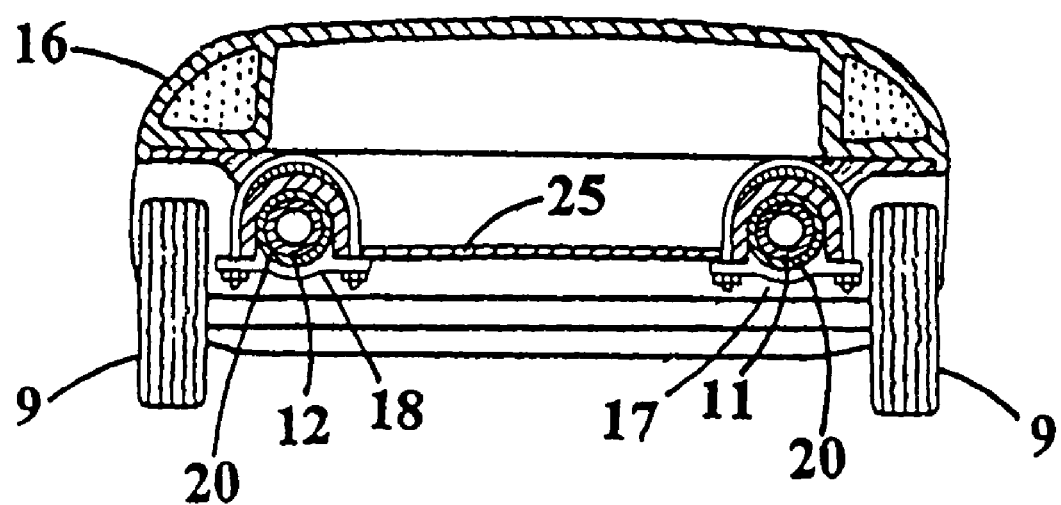
FIG. 9 is a sectional view along line 9-9 of FIG. 1.
Figure 10:
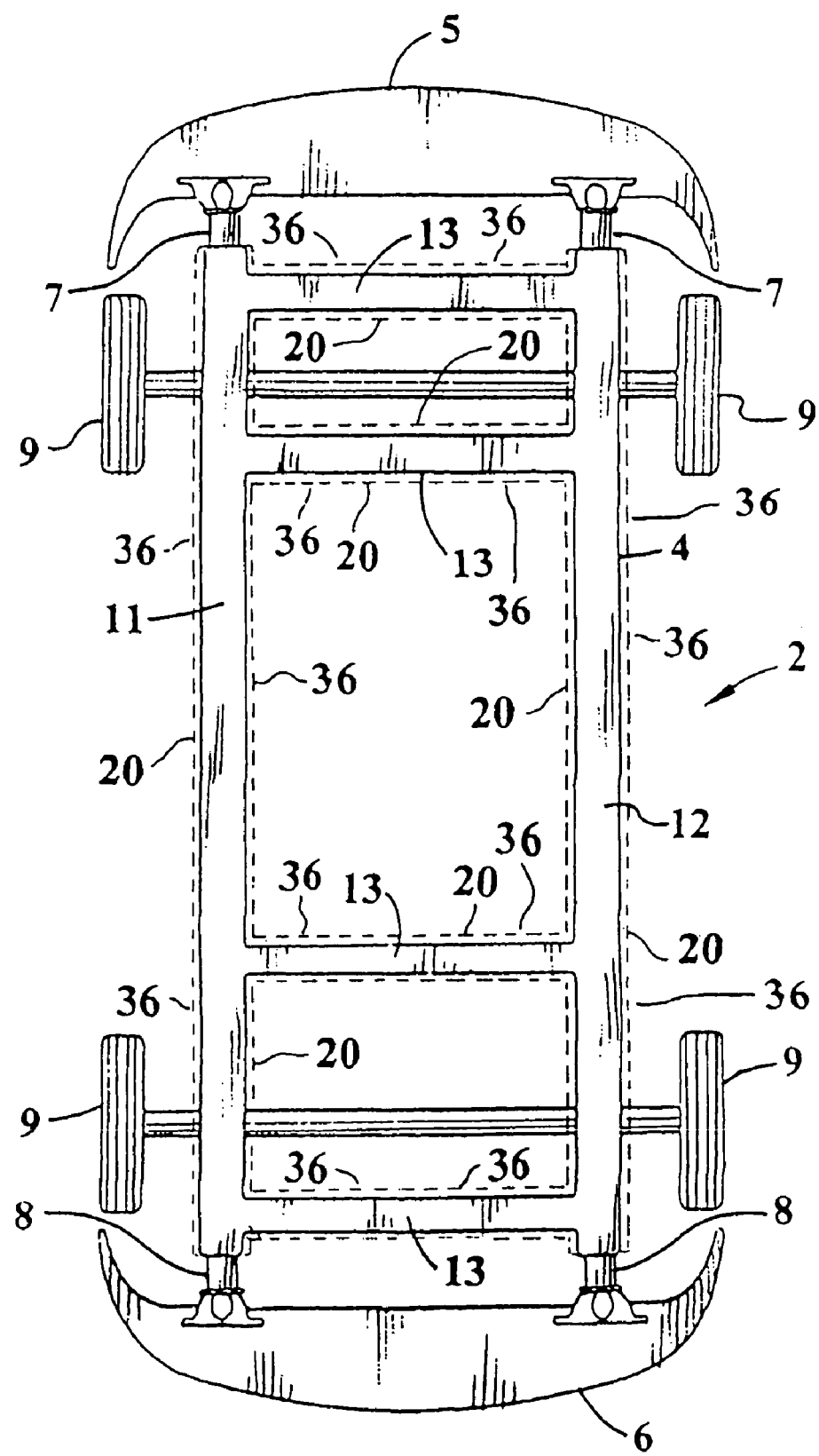
FIG. 10 is a top view of the chassis assembly of the vehicle.

Floor module 14 has in its under-surface left and right groove longitudinal receiving groove troughs 17 and 18, respectively, which open in a downward direction. Left longitudinal trough 17 is adapted to receive left longitudinal member 11 of framework 4 during assembly, and right longitudinal trough 18 is formed to receive right longitudinal framework member 12. The under-surface of floor module 14 additionally contains four transverse troughs 19 adapted to receive cross members 13 of framework 4 during assembly. The cross-sectional dimensions and configuration of said troughs are such as to closely match the cross-sectional dimensions and configuration of the associated structural framework members. It has been found that circular cross-sectional contours of the framework members and receiving troughs provide the most efficient and uniform distribution and dissipation of stress forces. Floor module 14 is therefore supported by framework 4 over an extensive area of contact with chassis structural members 11, 12 and 13. Floor module 14 further comprises a floor portion 37. The configurations of module 14, floor portion 37 and said receiving troughs are such that, when the module is seated upon the framework, the lower surface of floor portion 37 is disposed below the framework at approximately the same elevation as the axles 38 of wheels 9, as best shown in FIG. 4. Bushing means 20 of suitable durable shock absorbing material are interposed in all areas of contact between said framework and floor module, as shown in FIGS. 4-12. FIG. 10 in particular illustrates the extent of distribution of bushing means 20 as shown by the dashed lines which cover virtually the entire outer surface of framework 4 where it comes in supportive contact with floor module 14.

Floor module 14 is secured onto framework 4 by standard U-bolts 35 placed over wide protective steel plates 32 and tightened by lock nuts 33 on U-bolt plates 34. Multiple U-bolts 35 may be placed at closely spaced regular intervals along longitudinal members 11 and 12, and along cross members 13 of framework 4, such as at securement points 36 shown in FIG. 10, to evenly distribute the compressive force of securement and avoid concentration of said compressive force on any one point of floor module 14. By spreading all loads and stresses between floor module 14 and framework 4 over broad areas of contact, and by protecting all said areas of contact with bushing material, the aforesaid interaction of components achieves full securement of floor module 14 to framework 4 and at the same time eliminates destructive stress points.

A preferred embodiment of said bushing means is a layer of uniform thickness of a resilient material such as rubber or synthetic elastomeric polymer. Said layer is preferably bonded by way of adhesive to either the framework structural members or the corresponding receiving troughs 19. The opposite, non-bonded surface of the resilient layer is preferably held by frictional force against the interactive trough or framework member. The resilient material preferably has a stiffness or hardness, as measured by the Shore A Durometer Hardness Test, between 50 and 80. A hardness below 50 permits unwanted movement between the framework and body, and a hardness greater than 80 does not provide adequate absorption and re-distribution of stress forces. For purposes of comparison, the rubber composition employed in fabricating most automotive tires has a Shore A Durometer hardness of about 75.

The thickness of the layer of shock absorbing material is preferably between ¼ and ¾ inch. Thicknesses below ¼ inch have been found to provide inadequate distribution of stress forces, and thicknesses above ¾ inch permit too much movement of the body with respect to the framework. In order to further restrict movement of the body with respect to the framework and ensure maximal securement of the body on the framework, the dimensions of the transverse grooves 19 of floor module 14, the diameter of cross members 13 of the framework, and the thickness of bushings 20 are constructed so that, when floor module 14 is mounted on said framework, the bushing 20 will be compressively wedged toward the front and rear walls 53 and 54, respectively of groove 19, thereby preventing forward and rearward displacement of floor module 14 on framework 4. Floor module 14 is also prevented from upward and downward displacement on the framework by the action of U-bolt 35, U-bolt plate 34 and lock-nuts 33. When lock-nut 33 is tightened, crossmember 13 is urged deeper into groove 19, thereby compressing bushing 20 against the arch 39 of groove 19 and against U-bolt plate 34, thereby restricting upward and downward movement of floor module 19 relative to the framework. The upper surface of U-bolt plate 34 preferably has an upwardly concave semi-cylindrical configuration so as to more closely follow the shape of bushing 20 and more evenly distribute the circumferential compressive pressure applied thereto.

Figure 11:
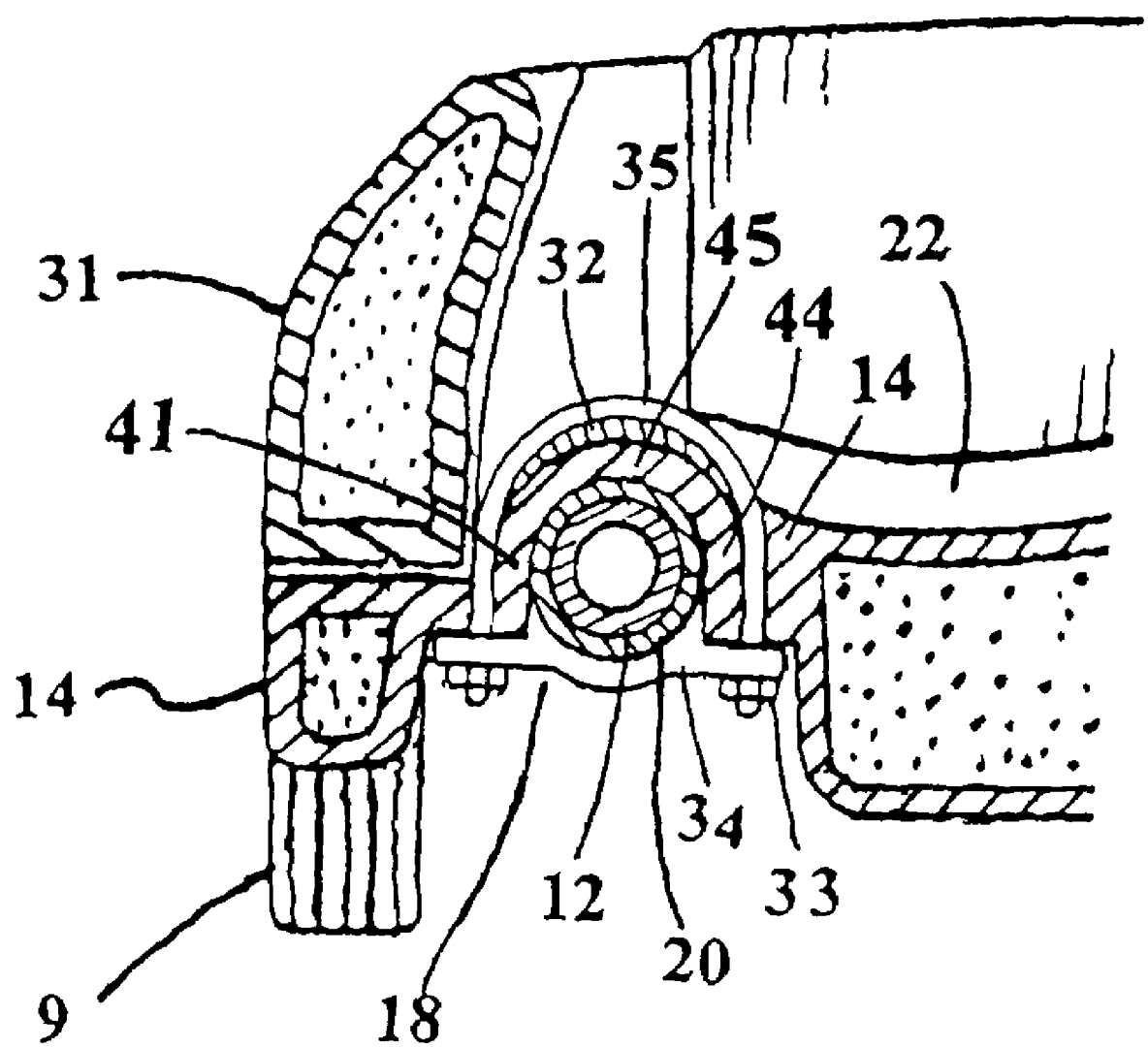
FIG. 11 is a magnified view of a fragmentary portion of FIG. 7 showing the manner of securement of floor module 14 to framework 4 using a U-bolt.
Figure 12:
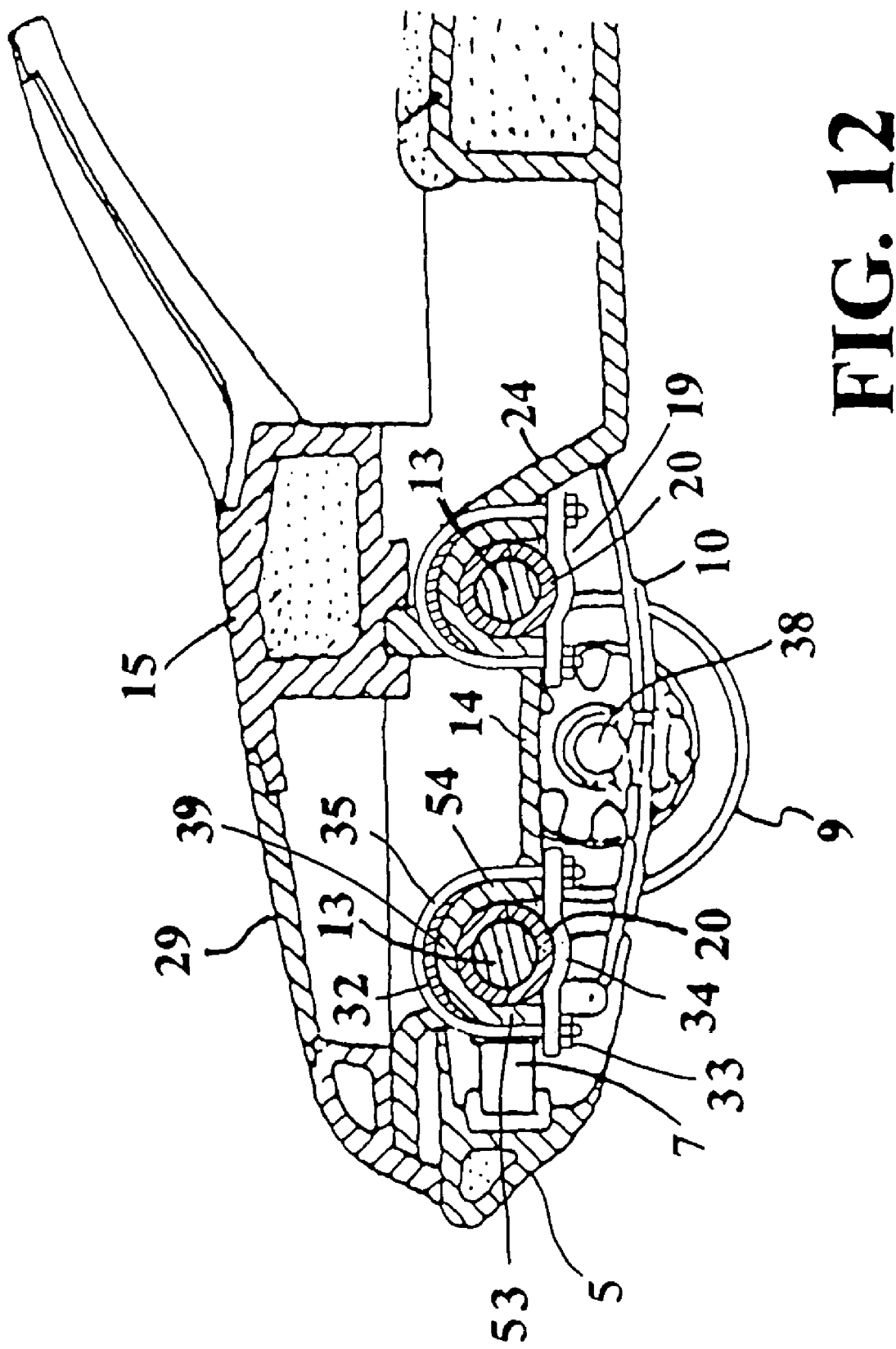
FIG. 12 is a magnified view of a fragmentary portion of FIG. 4 showing the manner of securement of floor module 14 to framework 4 using a U-bolt.

Turning now to FIG. 11, bushing 20 is likewise compressively wedged between longitudinal member 12 and the arch 45, lateral wall 41 and medial wall 44 of longitudinal groove 18, and also wedged against U-bolt plate 34 by tightening nut 33 on U-bolt 35, thus securing floor module 14 from upward, downward and sideward displacement upon framework 4. Steel plate 32 is interposed between U-bolt 35 and the arches 45 and 39 of grooves 18 and 19, respectively, to prevent damage on said arches 45 and 39 from pressure from the U-bolt 35. This is best achieved if the steel plate 32 is configured to follow closely the upper surfaces of arches 45 and 39 and if protective padding of suitable material such as felt fabric is interposed between said steel plate 32 and said arches 45 and 39.

In order to resist the deleterious effects of oil, oxidation, aging and weathering, the resilient material comprising the bushing is preferably fabricated of neoprene or nitrile-based rubber. In one embodiment, the resilient layer is bonded to only one of the interactive surfaces, namely the framework or floor module, in order to minimize shearing forces within the layer. Such shearing forces might otherwise destroy the adhesive bond. The shock absorbing layer may be bent into shape during bonding, or may be separately produced by way of a molding or extrusion operation. Bonding adhesives of commercial availability may be employed.

In the exemplified embodiment, floor module 14 includes integral seats 21 on which suitable cushions 22 may be placed or affixed. Other features include foot well 23, fire wall 24, trunk floor 25 and engine compartment floor 26.

The peripheral edges of cowl module 15 are designed to have broad areas of contact with the floor module for secure attachment as shown. A tongue-and-groove joint helps secure a strong attachment, such as that formed by the groove 27 in the under-surface of cowl module 15 and the tongue 28 forming part of firewall 24 of floor module 14. Mortise and tenon joints may also be employed for improved precision of placement, secure joinder and easy "snap fit" assembly. Further economy of manufacture may be gained by fabricating the hood cover 29 in the same mold with cowl module 15 and employing an integral or "living" hinge.

Rear module 16 is likewise designed to have broad areas of contact with floor module 14 for secure bonded attachment, possibly facilitated and strengthened by tongue-and-groove, mortise and tenon, and "snap fit" means. Jointly molded and integrally hinged trunk lid 30 yields further economies.

Doors 31 may be fabricated similarly, with strong plastic skin and rigid structural plastic foam core, by rotational molding and/or injection molding as previously described.

Although the drawings illustrate a convertible automobile, the vehicle may be manufactured with a suitable hard top, or retro-fitted with one, preferably with suitable reinforcement for rollover protection.

Furthermore, the same system of manufacture can be used to manufacture a station wagon, a minivan, a pickup truck or a sports-utility vehicle, achieving the same ease and economy of manufacture, versatility in the choice of forms and designs, lightness of the vehicle, and resistance to being dented or being rusted.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

What is claimed is:

1. An automotive vehicle comprising:
   a) a chassis comprising a metal framework having paired elongated straight longitudinal structural members, and cross structural members orthogonally joined to said longitudinal members, said structural members having uniform circular cross sectional configurations,
   b) a body comprised of interlocked plastic components, including a floor module containing downwardly opening troughs adapted to seat upon said structural members, and
   c) bushing means compressively secured between said structural members and troughs in a manner to bear and absorb all loads, stresses and vibrations between said body and chassis.

2. The automotive vehicle of claim 1 wherein threadably adjustable U-bolts are employed to compressively secure said bushing means between said structural members and troughs.

3. The automotive vehicle of claim 2 wherein said bushing means is a layer of a resilient material of uniform thickness.

4. The automotive vehicle of claim 3 wherein said thickness is between ¼ and ¾ inch.

5. The automotive vehicle of claim 4 wherein said resilient material has a Shore A Durometer Hardness between 50 and 80.

6. The automotive vehicle of claim 2 wherein said plastic components contain internal reinforcement.

7. The automotive vehicle of claim 6 wherein said internal reinforcement is of metal construction.

8. The automotive vehicle of claim 6 wherein said internal reinforcement involves cellular polymer structure.

9. The automotive vehicle of claim 3 wherein said layer is bonded to either said structural member or associated trough.

* * * * *